United States Patent
Ushiwata et al.

[11] Patent Number: 5,425,294
[45] Date of Patent: Jun. 20, 1995

[54] DESK-TOP CUTTING MACHINE WITH TILTABLE SAW

[75] Inventors: Shigeharu Ushiwata; Ryuichi Imamura, both of Fukushima, Japan

[73] Assignee: Hitachi Koki Haramachi Co., Ltd., Fukushima, Japan

[21] Appl. No.: 70,799

[22] Filed: Jun. 3, 1993

[51] Int. Cl.⁶ .............................................. B27B 5/20
[52] U.S. Cl. .................... 83/471.3; 83/468.3; 83/470; 83/581
[58] Field of Search ............... 83/471.1, 471.2, 471.3, 83/490, 581, 563, 473, 477.1, 468.3; 30/376, 388

[56] References Cited

U.S. PATENT DOCUMENTS

| | | | |
|---|---|---|---|
| 4,694,721 | 9/1987 | Brickner | 83/471.3 |
| 4,869,142 | 9/1989 | Sato et al. | 83/490 |
| 4,934,233 | 6/1990 | Brundage et al. | 83/490 |
| 5,046,390 | 9/1991 | Saski | 83/490 |
| 5,054,352 | 10/1991 | Fushiya et al. | 83/490 |
| 5,181,448 | 1/1993 | Terpstra | 83/490 |
| 5,189,937 | 3/1993 | Garuglieri | 83/477.1 |
| 5,241,888 | 9/1993 | Chen | 83/490 |

FOREIGN PATENT DOCUMENTS 63-49901 4/1988 Japan.

*Primary Examiner*—Eugenia Jones
*Assistant Examiner*—Allan M. Schrock
*Attorney, Agent, or Firm*—Sughrue, Mion, Zinn, Macpeak & Seas

[57] ABSTRACT

A desk-top miter saw with a bevel function is improved through the use of a belt drive transmission between the saw shaft and the motor drive shaft. This allows the unit to be more compact while simultaneously offering a greater bevel tilt range of the saw. A centering detent mechanism is used to correctly locate the turntable for zero-angle (non bevel) cutting.

5 Claims, 6 Drawing Sheets

DESK-TOP CUTTING MACHINE WITH TILTABLE SAW

BACKGROUND OF THE INVENTION

1. Field of the Invention

The present invention relates to a desk-top cutting machine whose saw can be tilted rightward and leftward relative to the top of the base of the machine.

2. Description of the Prior Art

FIGS. 6 and 7 show a conventional desk-top cutting machine in which a saw shaft 9 supporting a saw 10, and the shaft 12 of a motor 11 are connected to each other through toothed engagement to transmit the motive power of the motor to the saw. Since the saw shaft 9 and the motor shaft 12 are disposed in parallel with each other, the motor 11 projects sideward from a circular saw assembly 8.

To tilt the circular saw assembly 8, a clamping lever 5 is loosened, a holder 6 is tilted, and the lever is thereafter tightened to keep the holder at a desired tilt angle. When a workpiece is normally cut by the tilted saw assembly 8, the angle of the desired tilt is usually 45 degrees. However, the end 15a of a motor housing 15 comes into contact with the top of base 1 when the saw assembly 8 is tilted rightward by an angle of 20 to 30 degrees, as shown in FIG. 7. For that reason, the workpiece cannot be cut at 45 degrees. Therefore, to cut the workpiece, the saw assembly 8 is tilted leftward, the workpiece is cut at the left-hand end and then the workpiece is flipped around and cut at the right-hand end. This means that the efficiency of the cutting work is very low.

To solve this problem, a tiltable circular saw assembly was developed as disclosed in Japanese Utility Model Application (OPI) No. 49901/88. In this machine, a saw shaft and a motor shaft are connected to each other through a bevel gear and a bevel pinion, and the motor housing extends transverse to the saw shaft, so that even if the circular saw assembly is tilted toward the side of the motor by an angle of 45 degrees, a space is left between the top of the base and the end of the housing to make it possible to cut the workpiece with the saw assembly tilted rightward. However, the bevel gear and the bevel pinion are expensive means for motive power transmission. Also, a gear box of high accuracy needs to be provided to reduce backlash between the gear and the pinion, the axes of which orthogonally intersect each other.

To cut the workpiece using the latter machine, the workpiece is supported on the top of the base, a clamping lever is loosened, a holder is swung rightward or leftward to tilt the saw assembly into a desired position, the lever is thereafter tightened to keep the saw assembly in position, and the assembly is then swung down to cut into the workpiece. After cutting the workpiece, the circular saw assembly is moved back to the uppermost location thereof. To cut the workpiece without a tilt, the zero-tilt graduation of a tilt scale provided on the holder is set using an indicator provided on a turntable, to put the holder in position, the clamping lever is then tightened to keep the holder in position, and the saw assembly is thereafter moved down to cut into the workpiece. However, since a tilt scale and the indicator are used to set the circular saw assembly at a zero-tilt angle, the assembly is likely to be inaccurately set at the zero angle due to parallax. Since the heavy circular saw assembly is swung rightward or leftward to be set at a desired tilt angle, it is difficult to accurately perform angular setting.

SUMMARY OF THE INVENTION

The present invention was made in order to solve the above-described problems of the conventional desk-top cutting machines.

Accordingly, it is an object of the invention to provide a desk-top cutting machine which includes a bevel saw assembly of a less expensive constitution.

It is another object of the invention to enhance the accuracy of cutting of a workpiece and to make it easy to set the circular saw assembly at a zero-tilt angle.

BRIEF DESCRIPTION OF THE DRAWINGS

Embodiments of the present invention are hereafter described with reference to the drawings, in which.

DETAILED DESCRIPTION OF THE PREFERRED EMBODIMENTS

Figure 1:
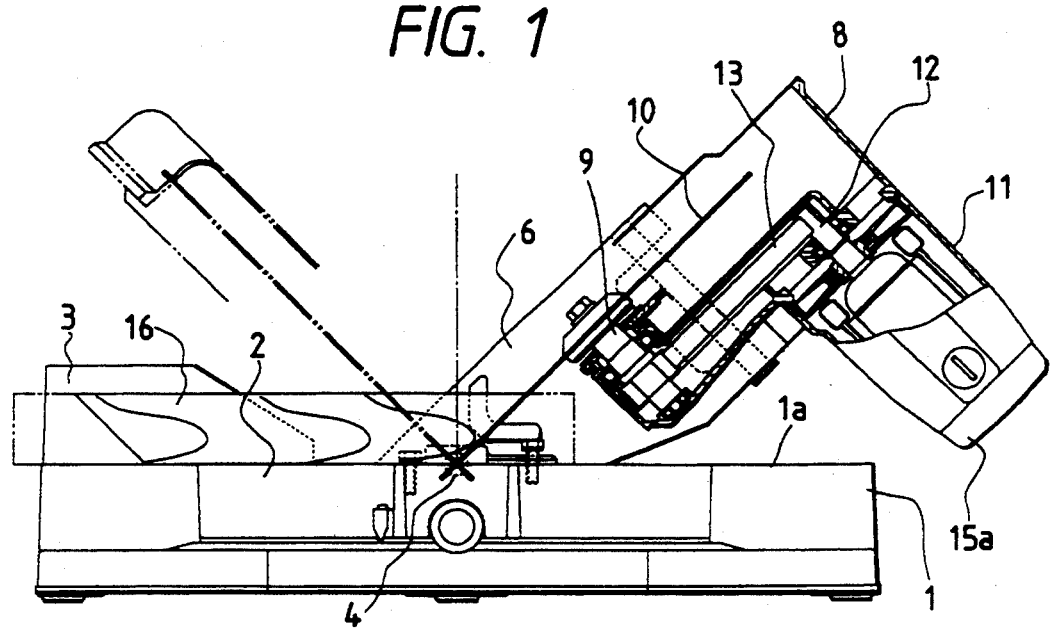
FIG. 1 is a cutaway front view of a desk-top cutting machine of the invention.
Figure 2:
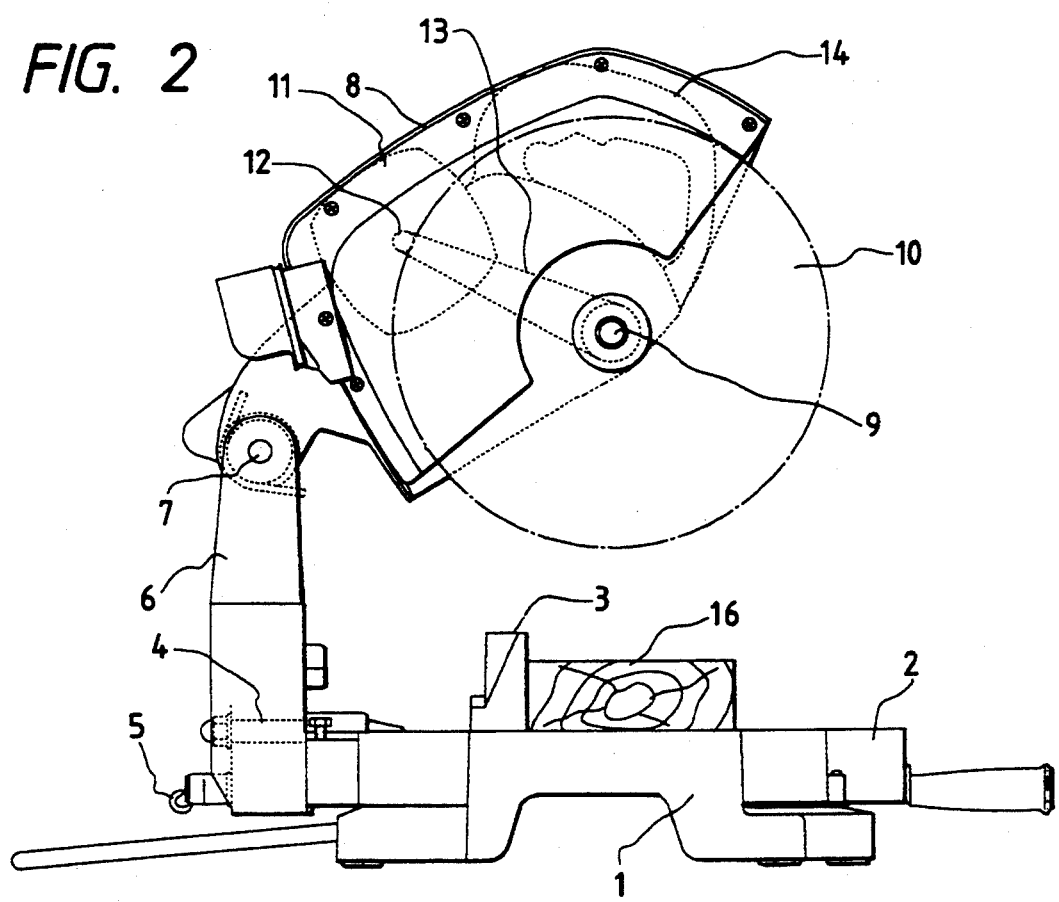
FIG. 2 is a side view of the machine of FIG. 1.
Figure 3:
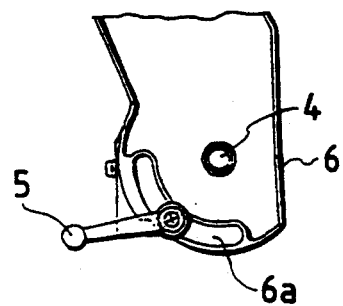
FIG. 3 is a partial rear view of the invention.

Referring to FIG. 1, a support member 3 for supporting the workpiece 16 is secured to the top of base 1. The turntable 2 is provided in the nearly central portion of the base 1 so that the turntable can be rotated. The holder shaft 4 is disposed at the rear of the turntable 2 so that the axis of the shaft is nearly at the level of the top of the turntable. The holder 6 is supported by the holder shaft 4 so that the holder can be tilted rightward and leftward relative to the turntable 2 about the shaft. The holder 6 has a slender hole 6a (FIG. 3) whose arc center is located at the holder shaft 4. The clamping lever 5 extends through the slender hole 6a. The screw-threaded tip portion of the lever 5 is engaged in tapped holes of the turntable 2. When the lever 5 is loosened, the holder 6 can be tilted within the range defined by the slender hole 6a, about the holder shaft 4. When the lever 5 is tightened, the holder 6 can be kept in a selected position.

The circular saw assembly 8 includes a saw shaft 9, a circular saw 10, a motor 11 for rotating the saw, a transmission belt 13, a cutting handle 14, and a housing 15. The saw assembly 8 is supported by a shaft 7 located at the top of holder 6 so that the assembly can be swung up and down relative to the base 1, about the shaft 7. Motor rotation is transmitted from the motor shaft 12 to the saw 10 through the vertical belt 13 and the saw shaft 9. The housing 15 covers and supports the saw shaft 9 and the motor 11. The circular saw 10 is supported by the saw shaft 9.

With the above construction, even if the circular saw assembly 8 is tilted rightward by an angle of 45 degrees as shown in FIG. 1, the end 15a of the housing 15 remains out of contact with the top 1a of the base 1 so that the space between the top of the base and the lower portion of the saw shaft 9 can be utilized to cut the workpiece 16.

To tilt the circular saw assembly 8, the clamping lever 5 is loosened, the holder 6 is tilted to a desired angle, and the lever is thereafter tightened to keep the holder so tilted.

Figure 5:
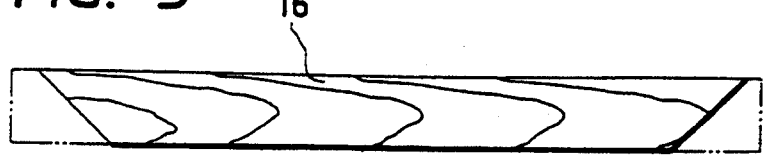
FIG. 5 is a front view of a workpiece illustrating bevel cutting.
Figure 6:
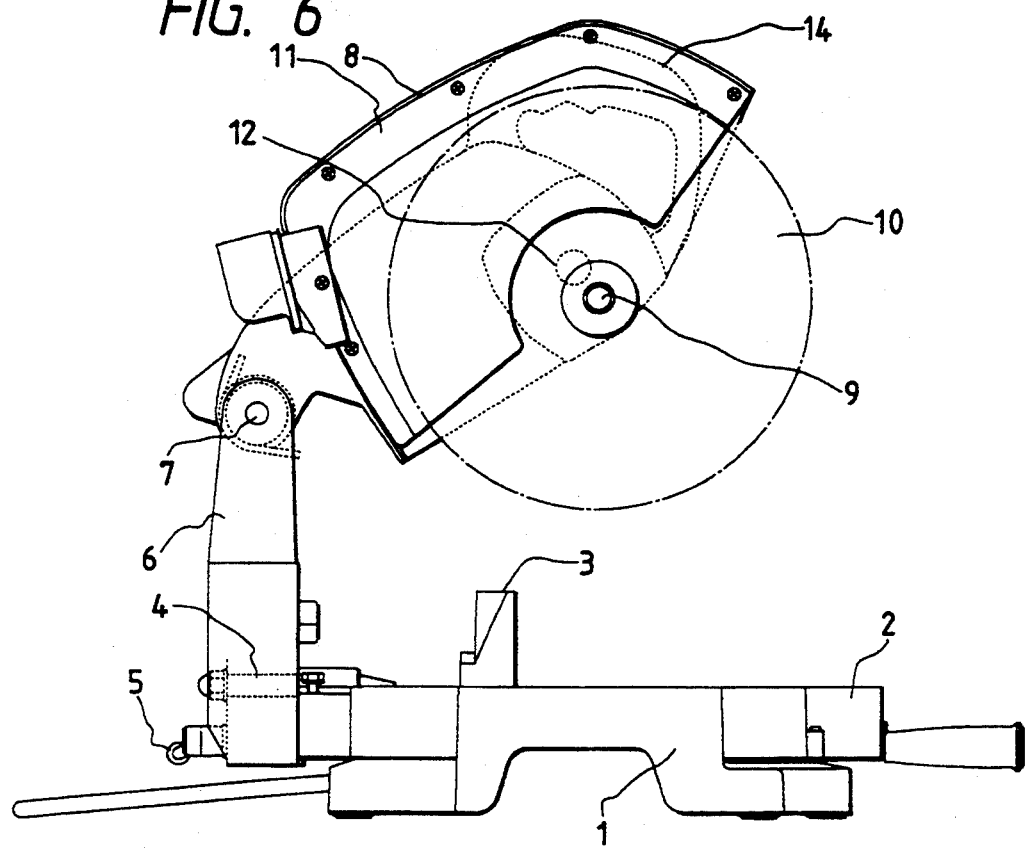
FIGS. 6 and 7 illustrate a prior art bevel miter saw.
Figure 7:
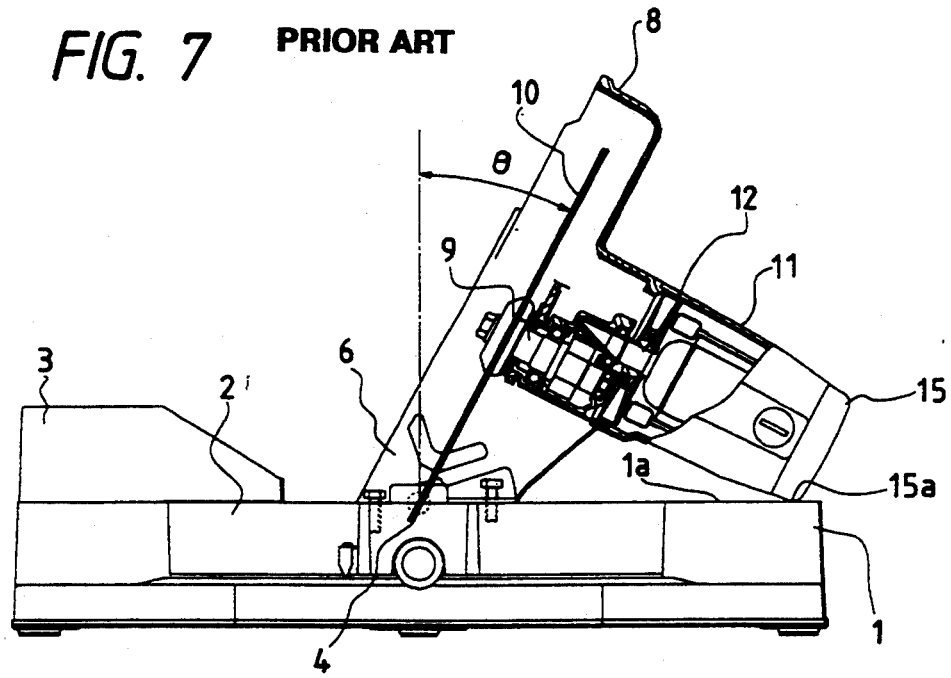
Figure 8:
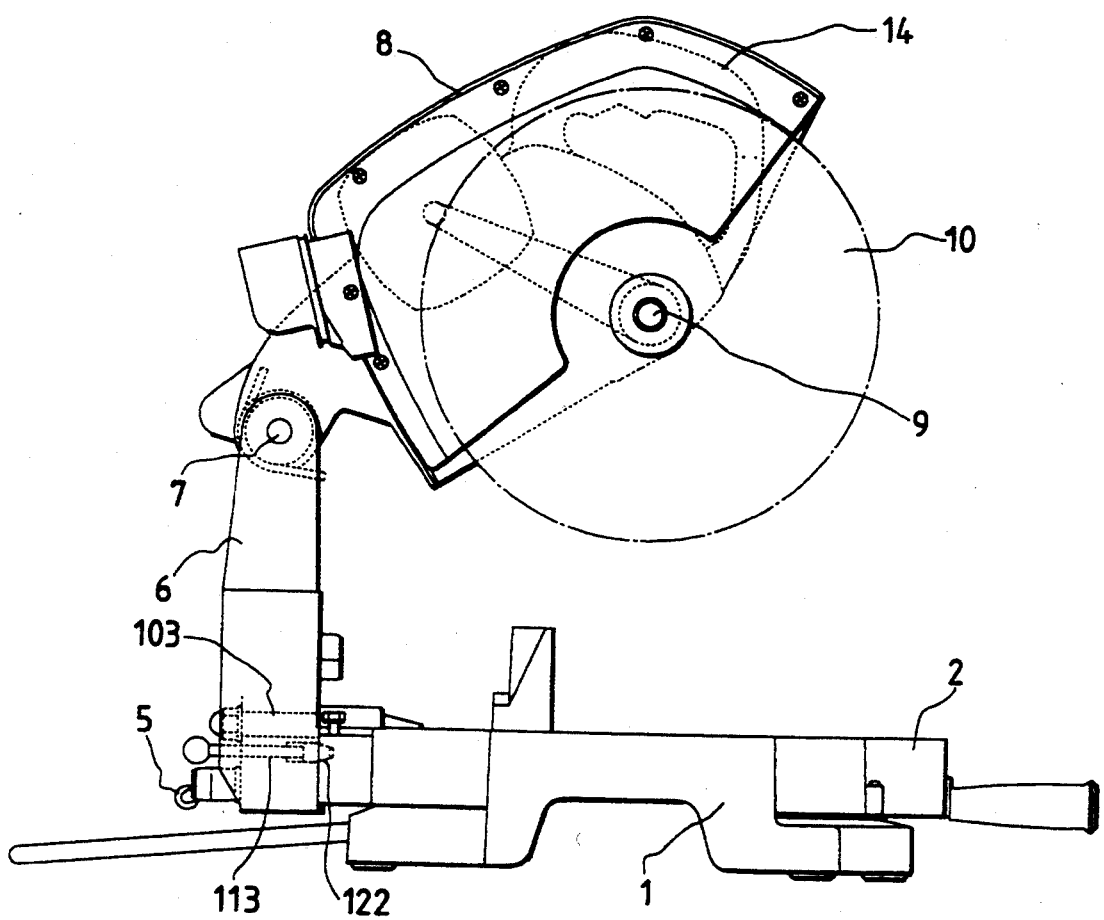
FIG. 8 is a partially cutaway side view of a second embodiment.
Figure 9:
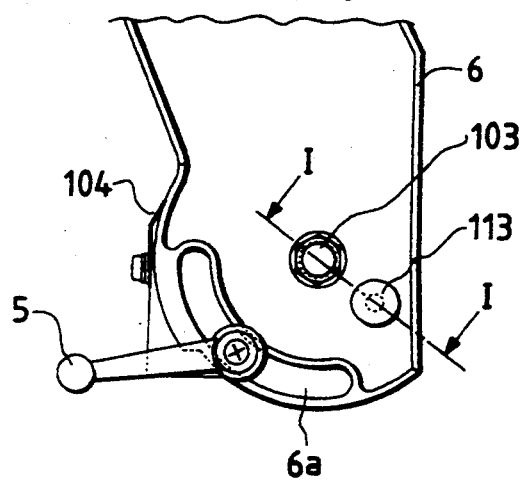
FIG. 9 is a detail of the holder mechanism therefor.
Figure 10:
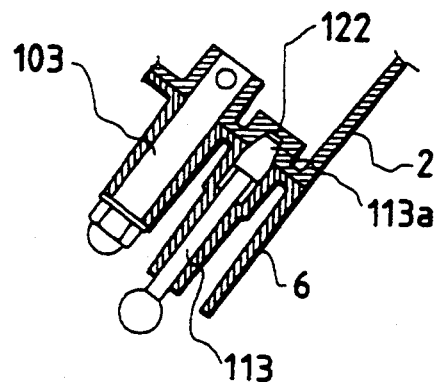
FIG. 10 is a sectional view showing a detent mechanism.
Figure 11:
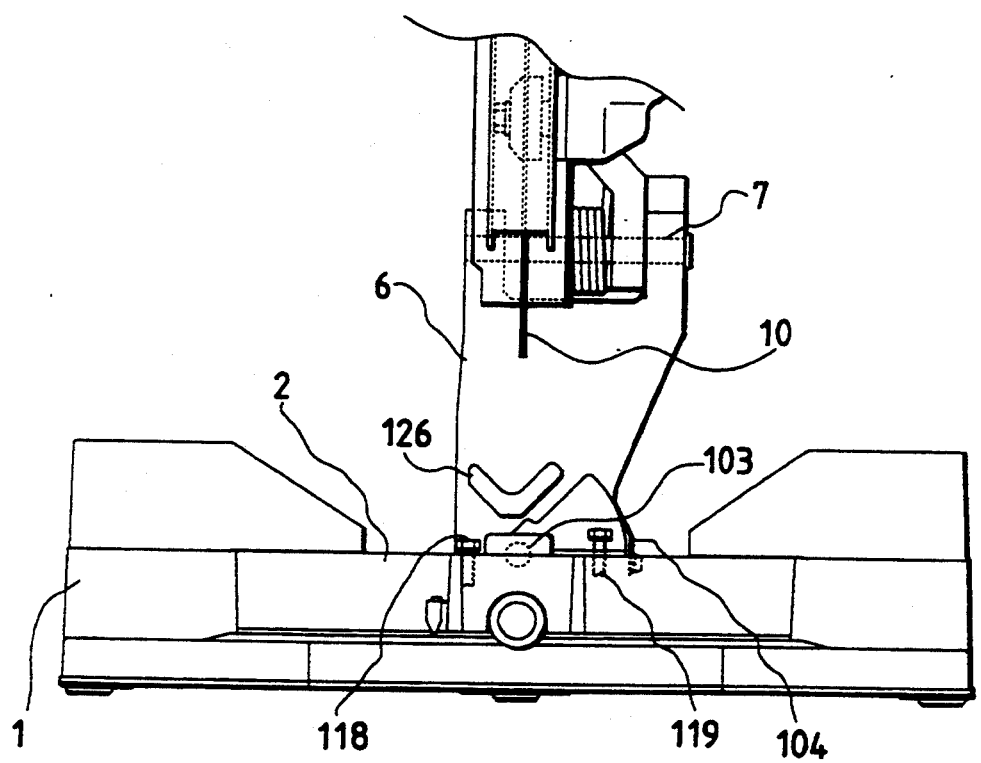
FIG. 11 is a front view of the second embodiment.

To cut a workpiece 16 as shown in FIG. 5, the circular saw assembly 8 is tilted rightward, the handle 14 is then grasped by hand to swing the assembly down to cut off the workpiece at the right-hand end thereof, the assembly is thereafter tilted leftward, and the workpiece is moved rightward on the base 1 and cut off at its left-hand end.

Figure 4:
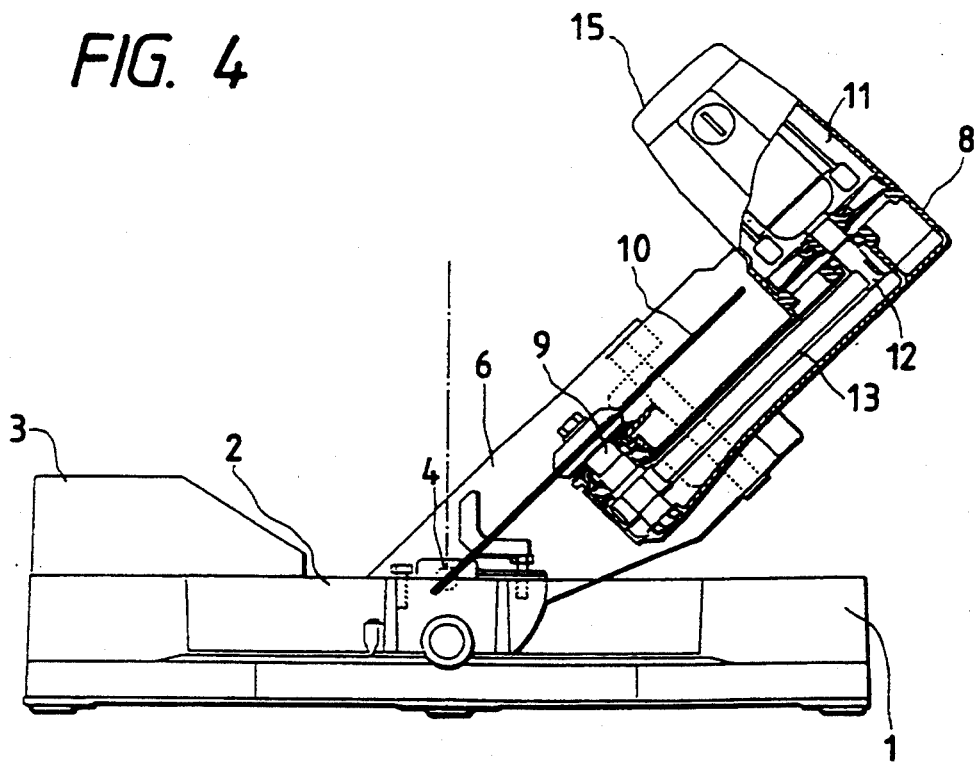
FIG. 4 illustrates the saw in bevel cutting position.
Figure 12:
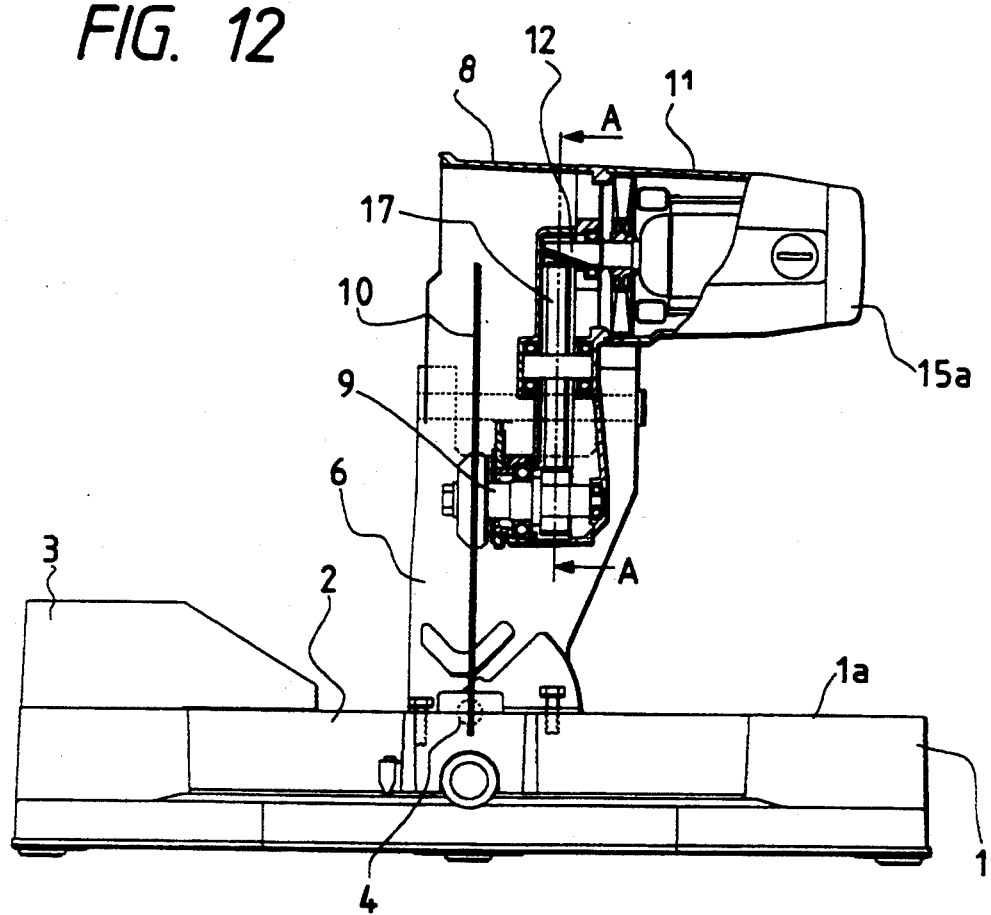
FIG. 12 is a partial cutaway front view of a desk-top cutting machine using a gear as a transmission means.
Figure 13:
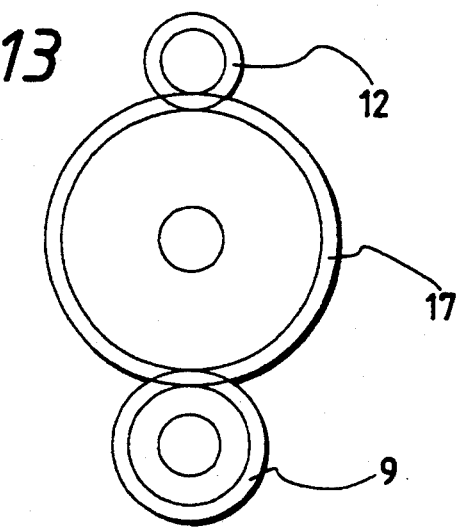
FIG. 13 is a sectional view of the transmission means of FIG. 12 taken along the line A—A.

A transmission means such as a gear 17 may be provided between the saw gear 9 and the motor shaft instead of the transmission belt 13, as shown in FIGS. 12 and 13. The housing 15 may be provided directly over the circular saw 10, as shown in FIG. 4 which is a cutaway front view.

The circular saw assembly is freely tilted right and left with respect to the 0 degree position whereby it is required to set the angle (0 degree) of the right-angle cutting, which is frequently used, with high accuracy.

Referring to FIGS. 8 to 11, a desk-top cutting machine according to a second embodiment will be described. The difference between this embodiment and the preceding one is that a stopper pin 113 for keeping the circular saw assembly 8 from being tilted is fitted in holder 6 so as to be slidable back and forth relative to turntable 2. The turntable has a hole or detent 122 into which the tip portion 113a of the pin can be removably inserted. The hole 122 is located so that the tapered tip portion 113a of the stopper pin 113 can be inserted into the hole when the same assembly is not tilted. Tip portion 113a serves a centering function during insertion to assure accurate alignment between holder 6 and turntable 2.

To tilt the circular saw assembly 8 to cut a workpiece, a clamping lever 5 is loosened, an indicator 104 is set at a desired numerical value to locate the saw assembly at a desired tilt angle, and the lever is thereafter tightened to keep the assembly at this angle. The usual tilt angle of the saw assembly 8 is 45 degrees. The range of the tilt of the assembly 8 is set by adjustment bolts 118 and 119, which cooperate in contact with a stopper 126 projecting from the holder 6.

To cut the workpiece square after cutting a workpiece at a bevel, the assembly is untilted while reading a tilt scale on the holder 6 and the indicator 104, and the stopper pin 113 is thereafter inserted into the hole 122 of the turntable 2 to accurately set the assembly at a zero-tilt angle.

Since the tip portion 113a of the stopper pin 113 is tapered and the hole 122 of the turntable 2 is shaped correspondingly so that it can be inserted into the hole without play, the circular saw assembly 8 can be more accurately set at the zero-tilt angle.

Since the motor shaft in accordance with the present invention is disposed in parallel with the saw shaft of the machine, over the latter shaft, a workpiece can be cut by the machine with the saw assembly thereof tilted toward the side of the motor. Cutting can thus be performed without flipping the workpiece around. This enhances the efficiency of the cutting work. Since the machine employs a transmission belt, the constitution of the machine is simple and less expensive. With the stopper pin which is fitted in the holder and removably inserted into the turntable to keep the holder at a zero-tilt angle, it is easy to manipulate the machine into a non-tilted position. Since the tip portion of the stopper pin is tapered and the hole of the turntable is shaped correspondingly so that it can be inserted without play, the machine can be more accurately set in the non-tilted position.

What is claimed is:

1. A desk-top cutting machine, comprising:
   a base on which a workpiece to be cut is supported, said base including a top surface;
   a turntable rotatably disposed in said base and including a top surface;
   a holder supported by said turntable for tilting transversely in opposite directions about a zero-tilt angle position;
   a circular saw blade;
   a saw shaft located above said holder for supporting said saw so that said saw is swung up and down relative to said base, about a pivot shaft;
   a circular saw assembly having a motor covered by a housing;
   a motor shaft of said motor being disposed in parallel with and above said saw shaft;
   transmission means through which said motor shaft is connected to said saw shaft so that an axis of said motor shaft is shifted from an axis of said saw shaft by a distance which is greater than or equal to the radius of said circular saw blade, wherein when said holder is tilted in either of said opposite directions by an angle greater than or equal to 45 degrees with respect to the zero-tilt angle position, said housing does not contact said top surface of said base.

2. A desk-top cutting machine as claimed in claim 1, wherein said transmission means comprises a transmission belt.

3. A desk-top cutting machine as claimed in claim 1, wherein said transmission means comprises a gear.

4. A desk-top cutting machine including a base on which a workpiece to be cut by said machine is supported, comprising:
   a turntable rotatably disposed in said base and extending horizontally;
   a holder provided at a rear of said base and tiltable in opposite directions about a plane extending vertically with respect to said base;
   a circular saw assembly disposed at the upper portion of said holder such that said assembly is swung up and down;
   a stopper pin provided in said holder; and
   a hole located in said turntable into which said pin is removably inserted, said hole being shaped and located so that said assembly is set only at a zero-tilt angle when said pin is inserted into said hole.

5. A desk-top cutting machine as claimed in claim 4, wherein said stopper pin includes a tapered tip portion and said hole is shaped correspondingly, so that said stopper pin is operative for insertion into said hole without play.

* * * * *